(12) United States Patent
Sundaram Ramasamy et al.

(10) Patent No.: US 12,384,323 B2
(45) Date of Patent: Aug. 12, 2025

(54) ROTATABLE SEATBELT BUCKLE

(71) Applicant: Ford Global Technologies, LLC, Dearborn, MI (US)

(72) Inventors: Murugan Sundaram Ramasamy, Canton, MI (US); Mangesh Kadam, Canton, MI (US); Srinivas Reddy Malapati, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 172 days.

(21) Appl. No.: 18/473,719

(22) Filed: Sep. 25, 2023

(65) Prior Publication Data
US 2025/0100502 A1  Mar. 27, 2025

(51) Int. Cl.
*B60R 22/20* (2006.01)
*B60R 22/18* (2006.01)
*B60R 22/26* (2006.01)

(52) U.S. Cl.
CPC .............. *B60R 22/20* (2013.01); *B60R 22/26* (2013.01); *B60R 2022/1806* (2013.01)

(58) Field of Classification Search
CPC . B60R 22/20; B60R 22/26; B60R 2022/1806; B60R 2022/207; B60R 2022/208
See application file for complete search history.

(56) References Cited

U.S. PATENT DOCUMENTS

| 5,431,448 A | 7/1995 | Ball et al. |
| 5,730,500 A * | 3/1998 | Cardona ................. B60R 22/20 297/483 |
| 6,213,513 B1 | 4/2001 | Grabowski et al. |
| 6,308,986 B1 | 10/2001 | Townsend et al. |
| 6,474,691 B2 | 11/2002 | Izume et al. |
| 6,572,147 B2 | 6/2003 | Webber et al. |

(Continued)

FOREIGN PATENT DOCUMENTS

| DE | 102014210623 A1 * | 12/2015 | ........... B60N 2/1615 |
| EP | 0802095 A2 * | 10/1997 | |

(Continued)

OTHER PUBLICATIONS

Notice of Allowance dated Mar. 21, 2025 re U.S. Appl. No. 18/473,631, filed Sep. 25, 2023.

(Continued)

*Primary Examiner* — Eric J Kurilla
(74) *Attorney, Agent, or Firm* — Frank A. MacKenzie; Brooks Kushman P.C.

(57) ABSTRACT

A vehicle includes a vehicle seat and a plate fixed relative to the vehicle seat. A seatbelt buckle is rotatably supported by the vehicle seat and is rotatable relative to the plate to one of a first or second position. A first and second slot are both in one of the plate or the seatbelt buckle. A pin supported by and movable to an extended position relative to one of the plate or the seatbelt buckle. The pin is spaced from the first and second slot when the seatbelt buckle is in a stowed position and is positioned to extend into the first or second slot when the seatbelt buckle is in the first or second position. A computer executes instructions to rotate the seatbelt buckle to one of the first or second position based on a size of an occupant and, then, move the pin to the extended position.

18 Claims, 16 Drawing Sheets

(56) References Cited

U.S. PATENT DOCUMENTS

| | | |
|---|---|---|
| 7,516,987 B2 | 4/2009 | Koide et al. |
| 8,376,407 B2 | 2/2013 | Adolfsson et al. |
| 8,606,465 B2 * | 12/2013 | Wang ................ B60R 21/01 |
| | | 701/1 |
| 8,851,522 B1 | 10/2014 | Srugis et al. |
| 9,725,022 B2 | 8/2017 | Shenaq et al. |
| 10,144,387 B1 | 12/2018 | Jaradi et al. |
| 10,988,062 B2 | 4/2021 | Sekizuka |
| 11,345,306 B1 | 5/2022 | Jaradi et al. |
| 2002/0089164 A1 | 7/2002 | Rouhana et al. |
| 2010/0219667 A1 | 9/2010 | Merrill et al. |
| 2012/0025588 A1 | 2/2012 | Humbert et al. |
| 2014/0021710 A1 * | 1/2014 | Rao ................ B60R 22/1951 |
| | | 280/806 |
| 2019/0135227 A1 | 5/2019 | Jaradi et al. |
| 2019/0291685 A1 * | 9/2019 | Ohno ................ B60R 22/023 |
| 2020/0339063 A1 | 10/2020 | Jaradi et al. |
| 2020/0346603 A1 | 11/2020 | Freedman et al. |
| 2022/0063552 A1 * | 3/2022 | Son ................ B60R 22/195 |
| 2023/0202423 A1 * | 6/2023 | Kini ................ B60R 22/1958 |
| | | 280/806 |
| 2024/0140352 A1 * | 5/2024 | Schneider ................ B60R 22/26 |

FOREIGN PATENT DOCUMENTS

| | | | |
|---|---|---|---|
| EP | 0802096 B1 | 10/1997 | |
| FR | 2695893 A1 * | 3/1994 | ............. B60R 22/20 |
| FR | 2843571 A1 * | 2/2004 | ......... B60R 22/1951 |
| GB | 2433475 A * | 6/2007 | ........... B60R 22/195 |
| KR | 19980039188 U * | 9/1998 | |
| KR | 19980046791 U * | 9/1998 | |
| KR | 20030016695 A * | 3/2003 | |
| KR | 20060127492 A * | 12/2006 | |
| KR | 101232458 B1 | 2/2013 | |

OTHER PUBLICATIONS

Notice of Allowance for U.S. Appl. No. 18/473,683, filed Sep. 25, 2023, as issued by the USPTO Aug. 19, 2024.

\* cited by examiner

US 12,384,323 B2

ROTATABLE SEATBELT BUCKLE

BACKGROUND

A vehicle includes a seatbelt assembly. The seatbelt assembly may include a seatbelt retractor and a webbing retractably payable from the seatbelt retractor. The seatbelt assembly includes an anchor coupled to the webbing, and a latch plate that engages a seatbelt buckle. The seatbelt assembly is disposed adjacent to a seat of the vehicle. The webbing extends continuously from the seatbelt retractor to the anchor. For example, one end of the webbing feeds into the seatbelt retractor, and the other end of the webbing is fixed to the anchor.

DETAILED DESCRIPTION

Figure 1:
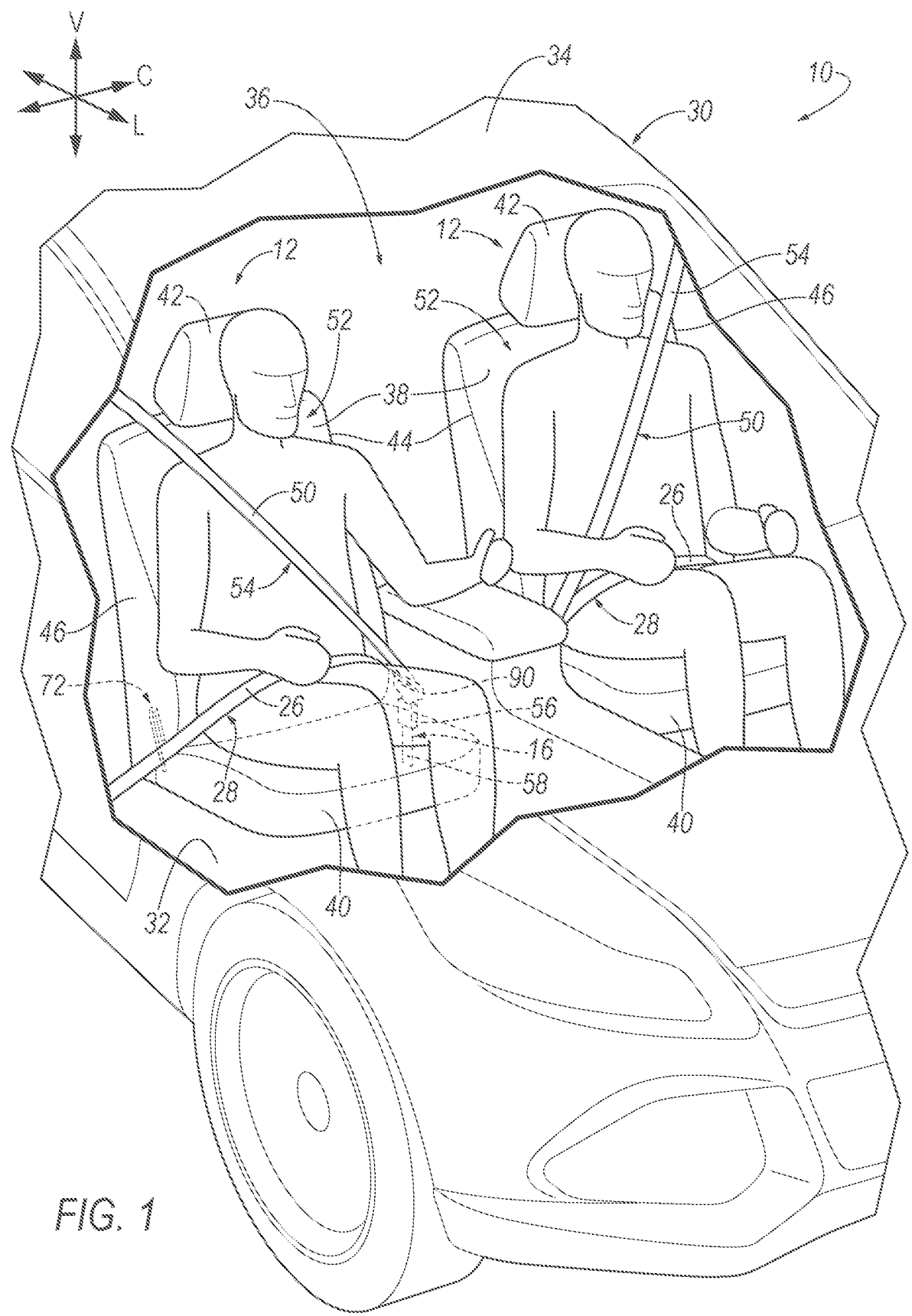
FIG. 1 is a perspective view of a vehicle.

A vehicle including a vehicle seat and a plate fixed relative to the vehicle seat. The vehicle includes a seatbelt buckle rotatably supported by the vehicle seat. The seatbelt buckle is rotatable relative to the plate from a stowed position to one of a first position or a second position. The vehicle includes a first slot and a second slot both in one of the plate or the seatbelt buckle. The vehicle includes a pin supported by the other of the plate or the seatbelt buckle. The pin is moveable relative to the other of the plate or the seatbelt buckle from a retracted position to an extended position. The pin is spaced from the first slot and the second slot when the seatbelt buckle is in the stowed position. The pin being positioned to extend from the retracted position to the extended position into the first slot when the seatbelt buckle is in the first position. The pin is positioned to extend from the retracted position to the extended position into the second slot when the seatbelt buckle is in the second position. The vehicle includes a computer including a processor and a memory storing instructions executable by the processor to rotate the seatbelt buckle to one of the first position or the second position based on a size of an occupant of the vehicle seat and then, move the pin to the extended position.

The vehicle may include a third slot in the same of the plate and the seatbelt buckle, the seatbelt buckle is rotatable to one of the first position, the second position, or a third position, and the pin being in the extended position and extending into the third slot when the seatbelt buckle is in the third position.

The seatbelt buckle may rotate about a rotational axis parallel to a cross-seat axis.

The pin may be spaced from the rotational axis.

The vehicle seat may include a seatback with the seatbelt buckle being rotatable away from the seatback from the stowed position to the first position and the second position.

The vehicle seat may include a seat bottom with the plate being fixed relative to the seat bottom and the seatbelt buckle is rotatable relative to the seat bottom.

The seatbelt buckle may be rotatable relative to the vehicle seat in a seat-forward direction.

The pin may move in a cross-seat direction from the retracted position to the extended position.

The seatbelt buckle may be rotatable about a rotational axis with the pin, the first slot, and the second slot being spaced from the rotational axis.

The vehicle may include a solenoid including the pin.

The pin may be biased toward one of the first slot or the second slot in the extended position.

The vehicle may include a latch plate engageable with the seatbelt buckle with the seatbelt buckle rotating away from the stowed position when the latch plate is engaged with the seatbelt buckle.

The pin may be moveable from the retracted position to the extended position when the latch plate is engaged with the seatbelt buckle.

The vehicle may include a webbing with the latch plate being moveable along the webbing to define a lap portion and the lap portion being moveable in a seat-forward direction as the seatbelt buckle moves from the stowed position toward the first position and the second position.

The vehicle may include a latch plate engageable with the seatbelt buckle and an actuator biasing the pin toward the extended position in response to detected engagement of the latch plate with the seatbelt buckle.

The instructions may include to detect engagement of a latch plate with the seatbelt buckle.

The instructions may include to detect disengagement of the latch plate with the seatbelt buckle.

The instructions may include to, based on detection of disengagement of the latch plate, move the pin from the extended position to the retracted position and rotate the seatbelt buckle to the stowed position.

With reference to the Figures, wherein like numerals indicate like parts throughout the several views, a vehicle 10 includes a vehicle seat 12 and a plate 14 fixed relative to the vehicle seat 12. A seatbelt buckle 16 is rotatably supported by the vehicle seat 12. The seatbelt buckle 16 is rotatable relative to the plate 14 from a stowed position to one of a first position or a second position. A first slot 18 and a second slot 20 are both in one of the plate 14 or the seatbelt buckle

16. A pin 22 is supported by the other of the plate 14 or the seatbelt buckle 16. The pin 22 is moveable relative to the other of the plate 14 or the seatbelt buckle 16 from a retracted position to an extended position. The pin 22 is spaced from the first slot 18 and the second slot 20 when the seatbelt buckle 16 is in the stowed position. The pin 22 is positioned to extend from the retracted position to the extended position into the first slot 18 when the seatbelt buckle 16 is in the first position. The pin 22 is positioned to extend from the retracted position to the extended position into the second slot 20 when the seatbelt buckle 16 is in the second position. A computer 24, hereinafter referred to as the "vehicle computer 24," includes a processor and a memory storing instructions executable by the processor to rotate the seatbelt buckle 16 to one of the first position or the second position based on a size of an occupant of the vehicle seat 12 and, then, move the pin 22 to the extended position.

Prior to the vehicle impact, the vehicle computer 24 determines the size of the occupant of the seat 12 and rotates the seatbelt buckle 16 to one of the first position or the second position corresponding to the size of the occupant. Sizes of occupants may be stored in the vehicle computer 24 and the sizes may correspond to the first position and the second position as described further below. After the seatbelt buckle 16 rotates to the first position or the second position, the pin 22 engages with one of the first slot 18 and the second slot 20 to maintain the seatbelt buckle 16 in the first position or the second position in the event of certain vehicle impacts. The pin 22 maintains the seatbelt buckle 16 in the first position or the second position to position a lap portion 26 of a seatbelt webbing 28, hereinafter referred to as "webbing 28," such that the webbing 28 may control the kinematics of the occupant of the vehicle seat 12.

With reference to FIG. 1, the vehicle 10 may be any suitable type of ground vehicle, e.g., a passenger or commercial automobile such as a sedan, a coupe, a truck, a sport utility, a crossover, a van, a minivan, a taxi, a bus, etc. Operations, systems, and methods described herein should always be implemented and/or performed in accordance with an applicable owner's/user's manual and/or safety guidelines.

The vehicle 10 defines a vehicle-longitudinal axis L extending between a front vehicle end (not numbered) and a rear vehicle end (not numbered) of the vehicle 10. The vehicle 10 defines a cross-vehicle axis C extending cross-vehicle from one side to the other side of the vehicle 10. The vehicle 10 defines a vertical axis V. The vehicle-longitudinal axis L, the cross-vehicle axis C, and the vertical axis V are perpendicular relative to each other.

As described further below, the vehicle 10 includes a vehicle body 30 including rockers (not numbered), roof rails (not shown), roof beams (not shown), pillars (not numbered), body panels (not numbered), vehicle floor 32, vehicle roof 34, etc. The vehicle 10 includes a passenger compartment 36 to house occupants, if any, of the vehicle 10. The passenger compartment 36 may extend across the vehicle 10, i.e., from one side to the other side of the vehicle 10. The passenger compartment 36 includes a front end (not numbered) and a rear end (not shown) with the front end being in front of the rear end during forward movement of the vehicle 10.

The vehicle roof 34 and the vehicle floor 32 are spaced from each other. Specifically, the vehicle floor 32 is spaced downwardly from the vehicle roof 34. The vehicle roof 34 defines the upper boundary of the passenger compartment 36 and may extend from the front end of the passenger compartment 36 to the rear end of the passenger compartment 36. The vehicle roof 34 may include a roof panel (not numbered) extending from one side of the vehicle 10 to the other. As an example, the roof panel may be attached to roof rails, e.g., by welding, fasteners, etc.

The vehicle 10 includes the vehicle floor 32 defining the lower boundary of the passenger compartment 36 and may extend from the front end of the passenger compartment 36 to the rear end of the passenger compartment 36. The vehicle floor 32 may include upholstery, for example, carpet, and may have a class-A surface facing the passenger compartment 36, i.e., a surface specifically manufactured to have a high quality, finished, aesthetic appearance free of blemishes.

With continued reference to Figures, the vehicle 10 may include one or more vehicle seats 12, hereinafter referred to as "seat 12." Specifically, the vehicle 10 may include any suitable number of seats 12. The seats 12 are supported by the vehicle floor 32. The seats 12 may be arranged in any suitable arrangement in the passenger compartment 36. As in the example shown in the Figures, one or more of the seats 12 may be at the front end of the passenger compartment 36, e.g., a driver seat and/or a passenger seat. In other examples, one or more of the seats 12 may be behind the front end of the passenger compartment 36, e.g., at the rear end of the passenger compartment 36. The seats 12 may be movable relative to the vehicle floor 32 to various positions, e.g., movable fore-and-aft and/or cross-vehicle. The seat 12 may be of any suitable type, e.g., a bucket seat.

With reference to FIGS. 1-7A, the seats 12 include a seatback 38, a seat bottom 40, and a head restraint 42. The head restraint 42 may be supported by and extend upwardly from the seatback 38. The head restraint 42 may be stationary or movable relative to the seatback 38. The seatback 38 may be supported by the seat bottom 40 and may be stationary or movable relative to the seat bottom 40. The seatback 38, the seat bottom 40, and the head restraint 42 may be adjustable in multiple degrees of freedom. Specifically, the seatback 38, the seat bottom 40, and the head restraint 42 may themselves be adjustable. In other words, adjustable components within the seatback 38, the seat bottom 40, and the head restraint 42 may be adjustable relative to each other.

The seats 12 includes a first side 44 and a second side 46 spaced cross-seat from the first side 44. In the example shown in the Figures, the first side 44 and the second side 46 are spaced cross-vehicle from each other. For example, the first side 44 is vehicle-inboard of the second side 46 and the second side 46 is vehicle-outboard of the first side 44. The second side 46 may be adjacent a door (not numbered) of the vehicle 10 and the first side 44 may be spaced vehicle-inboard from the door of the vehicle 10.

The seatback 38 and/or the seat bottom 40 includes a seat frame 48 and a covering (not numbered) supported on the seat frame 48. The seat frame 48 may include tubes, beams, etc. Specifically, the seat frame 48 includes a pair of upright frame members (not shown). The upright frame members are elongated, and specifically, are elongated in a generally upright direction when the seatback 38 is in a generally upright position. The upright frame members are spaced from each other and the seat frame 48 includes one or more cross-members extending between the upright frame members. The seat frame 48, including the upright frame members, may be of any suitable plastic material, e.g., carbon fiber reinforced plastic (CFRP), glass fiber-reinforced semi-finished thermoplastic composite (organosheet), etc. As another example, some or all components of the seat frame 48 may be formed of a suitable metal, e.g., steel, aluminum, etc.

The covering may include upholstery, padding, and/or plastic portions. The upholstery may be cloth, leather, faux leather, or any other suitable material. The upholstery may be stitched in panels around the seat frame 48. The padding may be between the covering and the seat frame 48 and may be foam or any other suitable material.

The seatback 38 and the seat bottom 40 define an occupant-seating area 52 of the seat 12. The occupant-seating area 52 is the area occupied by an occupant when properly seated on the seat bottom 40 and the seatback 38. The occupant-seating area 52 is in a seat-forward direction F of the seatback 38 and above the seat bottom 40. In the example shown in the Figures, the occupant-seating area 52 faces the front end of the passenger compartment 36 when the seat 12 is in the forward-facing position.

The vehicle 10 includes a seatbelt assembly 50 that includes a retractor (not shown), the webbing 28, and a latch plate 90. The webbing 28 is retractably payable from the retractor. The seatbelt assembly 50 may include an anchor (not shown) fixed relative to the seat 12. In some examples, the anchor may be fixed to the seat 12, e.g., the seat bottom 40. In other examples, the anchor may be fixed to other components of the vehicle 10, e.g., the vehicle floor 32, pillars, etc. The anchor is coupled to the webbing 28 and the anchor fixes at least one end of the webbing 28 relative to the seat 12. The latch plate 90 is engageable with the seatbelt buckle 16. In other words, the webbing 28 is engageable with the seatbelt buckle 16. The seatbelt buckle 16 is fixed to the first side 44 of the seat 12. In other words, the seatbelt buckle 16 is fixed to the side of the seat 12 that is opposite the seatbelt assembly 50. The latch plate 90 may be movable from an unbelted position to a belted position. In other words, the latch plate 90 may be engaged with the seatbelt buckle 16 in the belted position and the latch plate 90 may be disengaged with the seatbelt buckle 16 in the unbelted position.

With continued reference to FIGS. 1-7A, the seatbelt assembly 50 may control the kinematics of the occupant of the seat 12, e.g., during sudden decelerations of the vehicle 10. The webbing 28 may extend continuously from the retractor to the anchor. For example, one end of the webbing 28 feeds into the retractor and the other end of the webbing 28 is fixed to the anchor. The webbing 28 may be fabric, e.g., woven polyester. The webbing 28 is dividable into the lap portion 26 and a shoulder portion 54. Specifically, the latch plate 90 is moveable along the webbing 28 to divide the webbing 28 into the lap portion 26 and the shoulder portion 54. The lap portion 26 and the shoulder portion 54 are defined by the latch plate 90 when the latch plate 90 is engaged with the seatbelt buckle 16. In the belted position, the lap portion 26 may extend along a lap of an occupant of the seat 12 and the shoulder portion 54 may extend along a shoulder of the occupant of the seat 12. Specifically, the latch plate 90 divides the webbing 28 into the lap portion 26 and the shoulder portion 54 and the latch plate 90 may move freely along the webbing 28. The lap portion 26 extends from the retractor to the seatbelt buckle 16 and the shoulder portion 54 extends from the seatbelt buckle 16 to the anchor.

The seatbelt buckle 16 and the plate 14 are each supported by the seat 12. Specifically, the seatbelt buckle 16 and the plate 14 are each supported by the first side 44 of the seat 12. The plate 14 is fixed relative to the seat 12. Specifically, the plate 14 is fixed relative to the seat bottom 40, e.g., the seat frame 48 of the seat bottom 40. In the example shown in the Figures, the plate 14 is fixed to the seat frame 48 of the seat bottom 40. The plate 14 may be fixed to the seat frame 48 of the seat bottom 40. The plate 14 may be concealed from view inside the passenger compartment 36. For example, the plate 14 may be between the seat frame 48 of the seat bottom 40 and the covering of the seat 12. The plate 14 may be fixed in any suitable way, e.g., fasteners, welding, unitary formation, etc. The plate 14 may be of any suitable shape. In the example shown in the Figures, the plate 14 is circular, however, the plate 14 may be of any other suitable shape, e.g., rectangular, etc. The plate 14 may be of any suitable material, e.g., steel, rigid plastic, other suitable metals, etc.

The seatbelt buckle 16 includes a buckle portion 56 and a bar portion 58. The bar portion 58 extends upwardly from the seat bottom 40 to the buckle portion 56. Specifically, the bar portion 58 includes a proximal end 60 and the bar portion 58 extends from the proximal end 60 to the buckle portion 56. The latch plate 90 engages with the buckle portion 56 when the latch plate 90 is in the belted position. The bar portion 58 may be rigid relative to the webbing 28 of the seatbelt assembly 50 between the proximal end 60 and the buckle portion 56. In other words, the bar portion 58 is not bendable relative to the webbing 28 between the proximal end 60 and the buckle portion 56.

The seatbelt buckle 16 is rotatable relative to the seat 12. The seatbelt buckle 16 is rotatably supported by the seat 12. Specifically, the seatbelt buckle 16 is rotatably supported by the seat bottom 40. The bar portion 58 of the seatbelt buckle 16 is rotatably supported by the seat bottom 40. The seatbelt buckle 16 is rotatable about a rotational axis A that is parallel to a cross-seat axis B. The cross-seat axis B is elongated from one side of the seat 12 to the other side of the seat 12. In the example shown in the Figures, the cross-seat axis B and the rotational axis A are elongated along a cross-seat direction S. The cross-seat direction S is elongated cross-vehicle. The bar portion 58 is rotatably supported by the seat bottom 40 at the proximal end 60. The seatbelt buckle 16 is rotatable relative to the seat bottom 40 and the seatbelt buckle 16 is rotatable relative to the plate 14. In other words, the seatbelt buckle 16 is rotatable relative to the seat bottom 40 and the plate 14 from the stowed position to one of the first position and the second position. Specifically, the bar portion 58 of the seatbelt buckle 16 rotates from the stowed position to one of the first position and to the second position. The proximal end 60 is centered on the plate 14 and the rotational axis A. In other words, the bar portion 58 rotates about the proximal end 60 at the center of the plate 14. The seatbelt buckle 16 of any one of the seats 12 of the vehicle 10, e.g., driver seat, passenger seat, etc., may be rotatable in the event of certain vehicle impacts.

As the seatbelt buckle 16 rotates from the stowed position to one of a plurality of other positions. For example, in the example shown in the Figures, the seatbelt buckle 16 rotates from the stowed position to the first position, the second position, and a third position. The seatbelt buckle 16 may rotate to any suitable number of positions. As the seatbelt buckle 16 rotates from the stowed position to the other positions, the seatbelt buckle 16 is rotatable away from the seatback 38. In other words, as the seatbelt buckle 16 rotates from the stowed position to the other positions, the buckle portion 56 moves in the seat-forward direction F. The buckle portion 56 moves adjacent the occupant-seating area 52 and in the seat-forward direction F. The lap portion 26 of the webbing 28 is moveable in the seat-forward direction F as the seatbelt buckle 16 moves from the stowed position toward one of the other positions. When the seatbelt buckle 16 is in the first position, the seatbelt buckle 16 is rotated farther from the seatback 38 relative to the stowed position. When the seatbelt buckle 16 is in the second position, the seatbelt buckle 16 is rotated farther from the seatback 38 relative to the first position. When the seatbelt buckle 16 is in the third position, the seatbelt buckle 16 is rotated farther from the seatback 38 relative to the second position.

Figure 2:
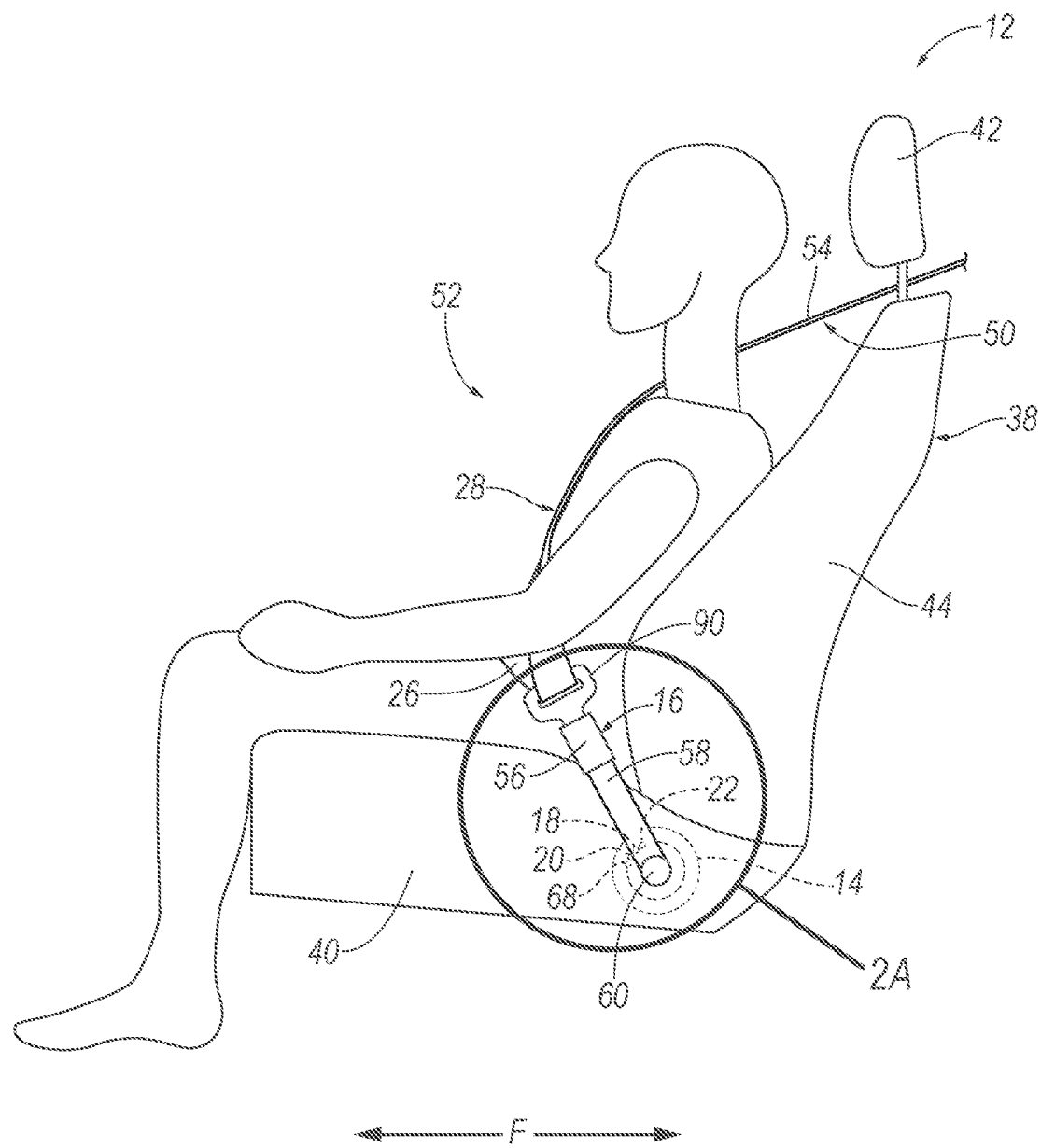
FIG. 2 is a first side view of a vehicle seat having a seatbelt buckle in a stowed position.
Figure 2A:
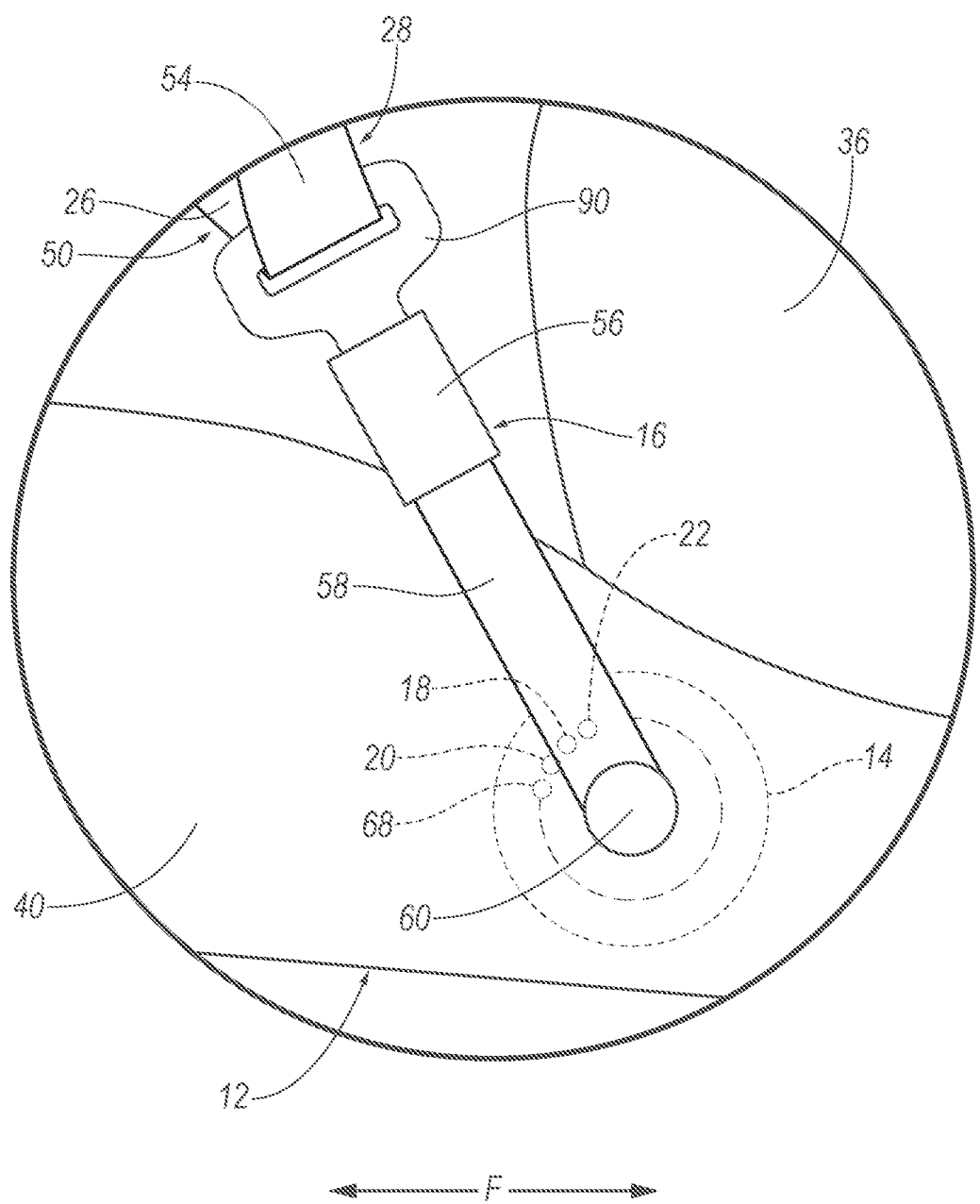
FIG. 2A is a side view of the seatbelt buckle in the stowed position.
Figure 3:
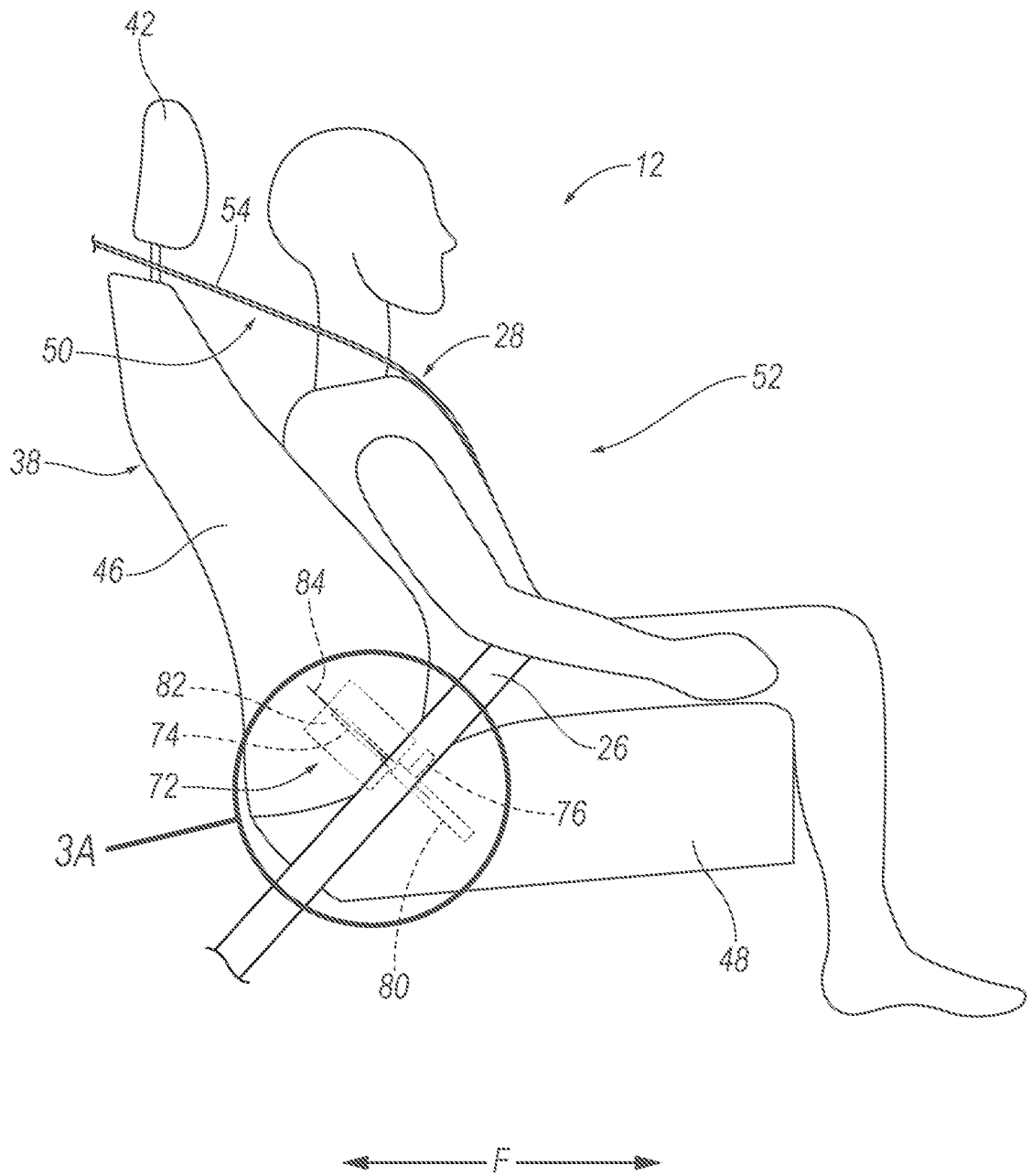
FIG. 3 is a second side view of the vehicle seat having a hook assembly in an extended position.
Figure 3A:
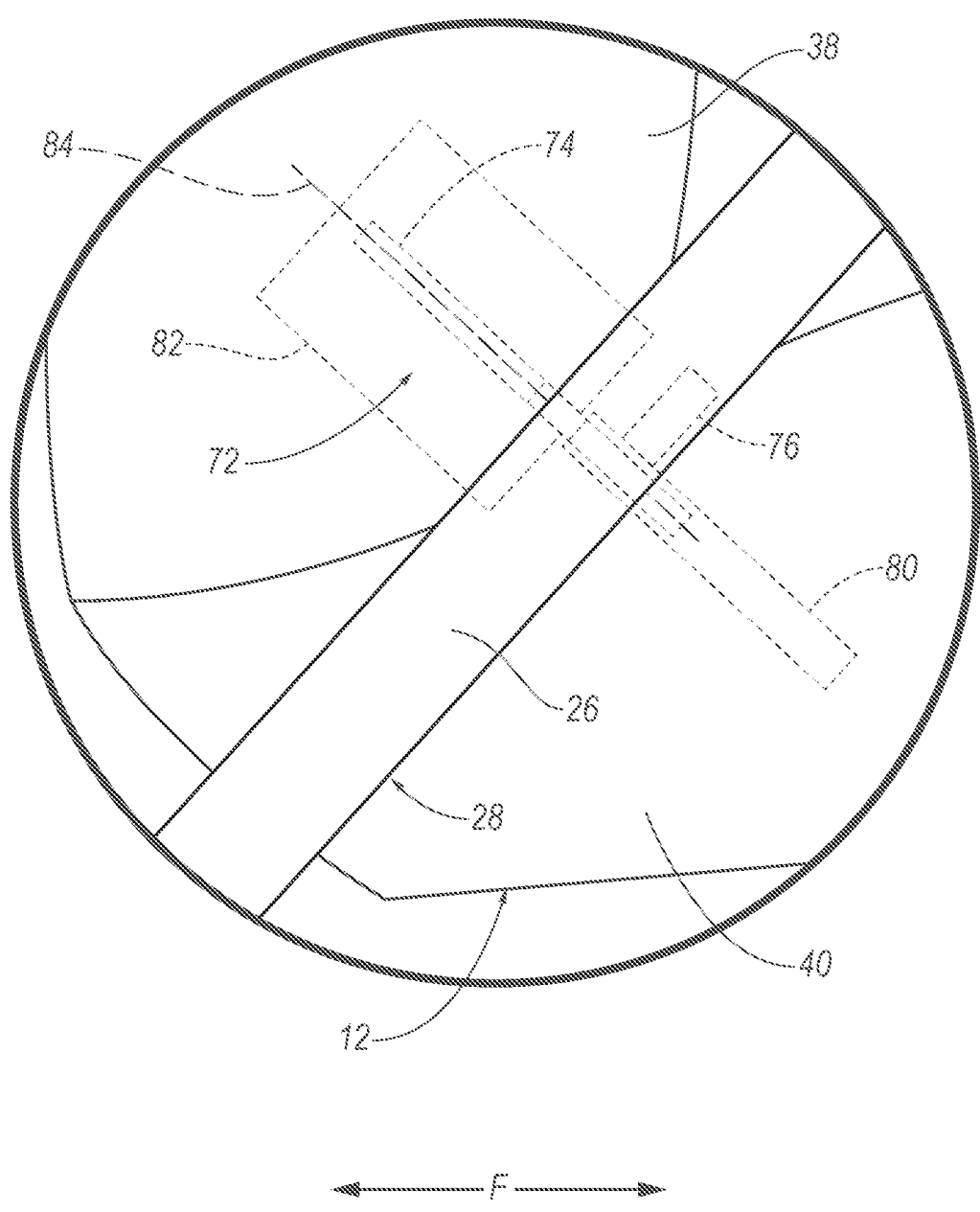
FIG. 3A is a side view of the hook assembly in the extended position.

With reference to FIGS. 2-2A, when no occupant is in the seat 12 of the vehicle 10 or when an occupant has just seated in the seat 12, the seatbelt buckle 16 is in the stowed position. When an occupant is seated in the seat 12 and the latch plate 90 is engaged with the seatbelt buckle 16, the vehicle computer 24 may receive a signal from an occupancy sensor 62 (described further below) indicating the size of the occupant in the seat 12. The seatbelt buckle 16 rotates away from the stowed position when the latch plate 90 is engaged with the seatbelt buckle 16. The vehicle computer 24 may store predetermined ranges of size of occupants that may be seated in the seat 12. Depending on the size of the occupant, the seatbelt buckle 16 rotates to a different position. For example, a smaller occupant may indicate the seatbelt buckle 16 to rotate to the first position, a medium occupant may indicate the seatbelt buckle 16 to rotate to the second position, and a larger occupant may indicate the seatbelt buckle 16 to rotate to the third position. In other words, the larger the occupant, the farther from the seatbelt buckle 16 is rotated from the seatback 38.

A motor 64 may be operatively coupled to the seatbelt buckle 16 to rotate the seatbelt buckle 16 to the various positions. A shaft 66 may extend in the cross-seat direction S between the motor 64 and the seatbelt buckle 16. Specifically, the shaft 66 may extend along the rotational axis A from the motor 64 to the bar portion 58 of the seatbelt buckle 16. The shaft 66 may be coupled to the proximal end 60 of the seatbelt buckle 16. The shaft 66 may be connected to the seatbelt buckle 16 to rotate the seatbelt buckle 16 from the stowed position to the other positions spaced from the stowed position.

With reference to FIGS. 4-7A, two or more slots are in one of the plate 14 and the seatbelt buckle 16 and the pin 22 is supported by the other of the plate 14 and the seatbelt buckle 16. In the example shown in the Figures, the slots 18, 20, 68 are in the plate 14. Specifically, the example in the Figures includes three slots in the plate, e.g., the first slot, the second slot, and a third slot 68. In other words, the plate 14 defines the slots 18, 20, 68. In such an example, the pin 22 is supported by the seatbelt buckle 16. The pin 22 is spaced from the rotational axis A. The pin 22 is spaced from the rotational axis A along the seatbelt buckle 16 and the slot 18, 20, 68 is spaced from the rotational axis A along the plate 14. In other words, the pin 22 and the slot 18, 20, 68 are each spaced from the proximal end 60 of the bar portion 58 of the seatbelt buckle 16. In other examples not shown in the Figures, the slots 18, 20, 68 may be in the seatbelt buckle 16, e.g., the bar portion 58 of the seatbelt buckle 16. In other words, the bar portion 58 of the seatbelt buckle 16 may define the slots 18, 20, 68. In such an example, the pin 22 is supported by the plate 14.

The slots 18, 20, 68 are aligned radially around the rotational axis A. Specifically, the slots 18, 20, 68 are each spaced equidistantly from the rotational axis A. The slots 18, 20, 68 and the pin 22 are both spaced from the rotational axis A. In both examples discussed above, the pin 22 is radially aligned with the slots 18, 20, 68 along the plate 14 and the seatbelt buckle 16. In other words, the pin 22 and the slots 18, 20, 68 spaced an equal distance from the rotational axis A. The number of slots in one of the plate 14 and the seatbelt buckle 16 is equal to the number of positions to which the seatbelt buckle 16 may rotate. For example, in the example shown in the Figures, the seatbelt buckle 16 may rotate to three different positions after the stowed position and, therefore, there are three different slots. The number of slots and number of seatbelt buckle 16 positions may be of any suitable number.

The pin 22 is moveable relative to one of the plate 14 and the seatbelt buckle 16 from the retracted position to the extended position. In the example shown in the Figures, the pin 22 is moveable relative to the seatbelt buckle 16. The pin 22 may be moveable into and out of the bar portion 58 of the seatbelt buckle 16. Specifically, the pin 22 is moveable in the cross-seat direction S. The pin 22 moves in the cross-seat direction S from the retracted position to the extended position. The pin 22 is in the retracted position when the seatbelt buckle 16 is in the stowed position and the latch plate 90 is disengaged from the seatbelt buckle 16. After the latch plate 90 is engaged with the seatbelt buckle 16 and once the seatbelt buckle 16 reaches one of the other positions spaced from the stowed position, the pin 22 moves to the extended position. In other examples, e.g., examples wherein the pin 22 is supported by the plate 14, the pin 22 is moveable relative to the plate 14.

The pin 22 is in the retracted position when the seatbelt buckle 16 is in the stowed position. In other words, the pin 22 is spaced from the slots 18, 20, 68 when the seatbelt buckle 16 is in the stowed position. Specifically, the pin 22 is spaced from the slots 18, 20, 68 along the rotational axis A when the seatbelt buckle 16 is in the stowed position. Once the latch plate 90 is engaged with the seatbelt buckle 16, the motor 64 rotates the seatbelt buckle 16 to the slot 18, 20, 68 corresponding to the size of the occupant in the seat 12. As described further below, the pin 22 moves to the extended position and into the associated slot 18, 20, 68.

Figure 4:
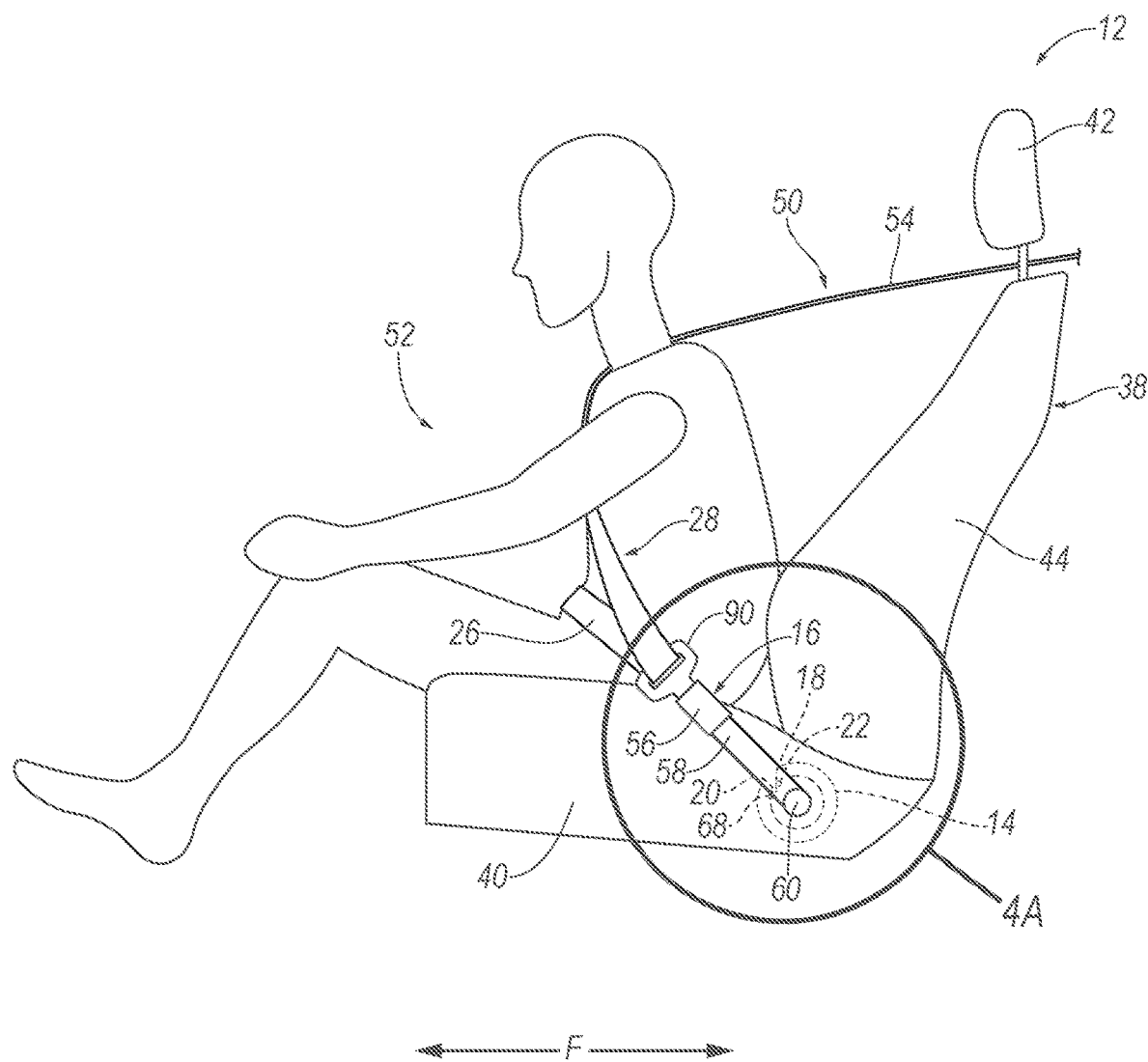
FIG. 4 is a side view of the vehicle seat having the seatbelt buckle in a first position.
Figure 4A:
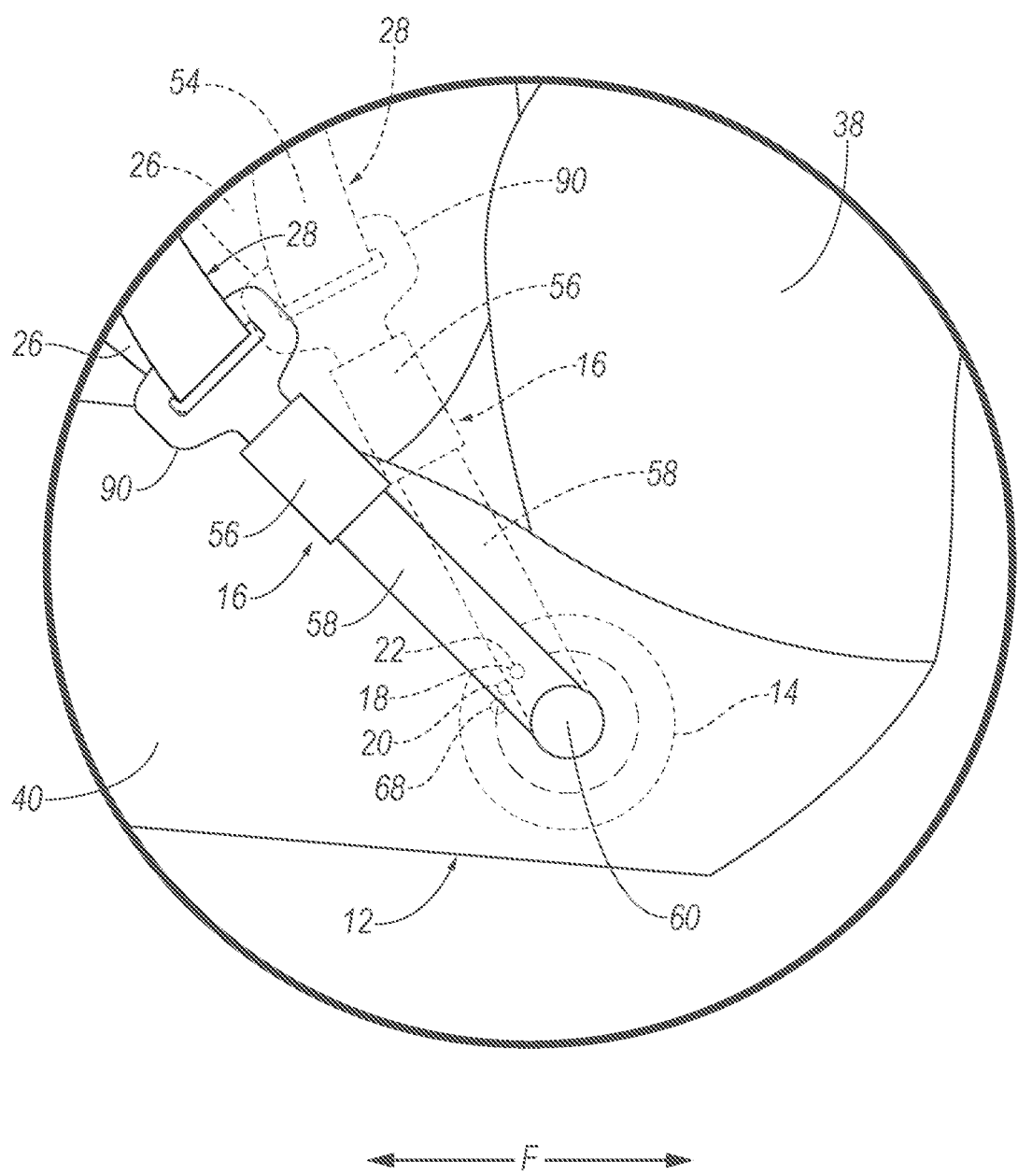
FIG. 4A is a side view of the seatbelt buckle in the first position.
Figure 5:
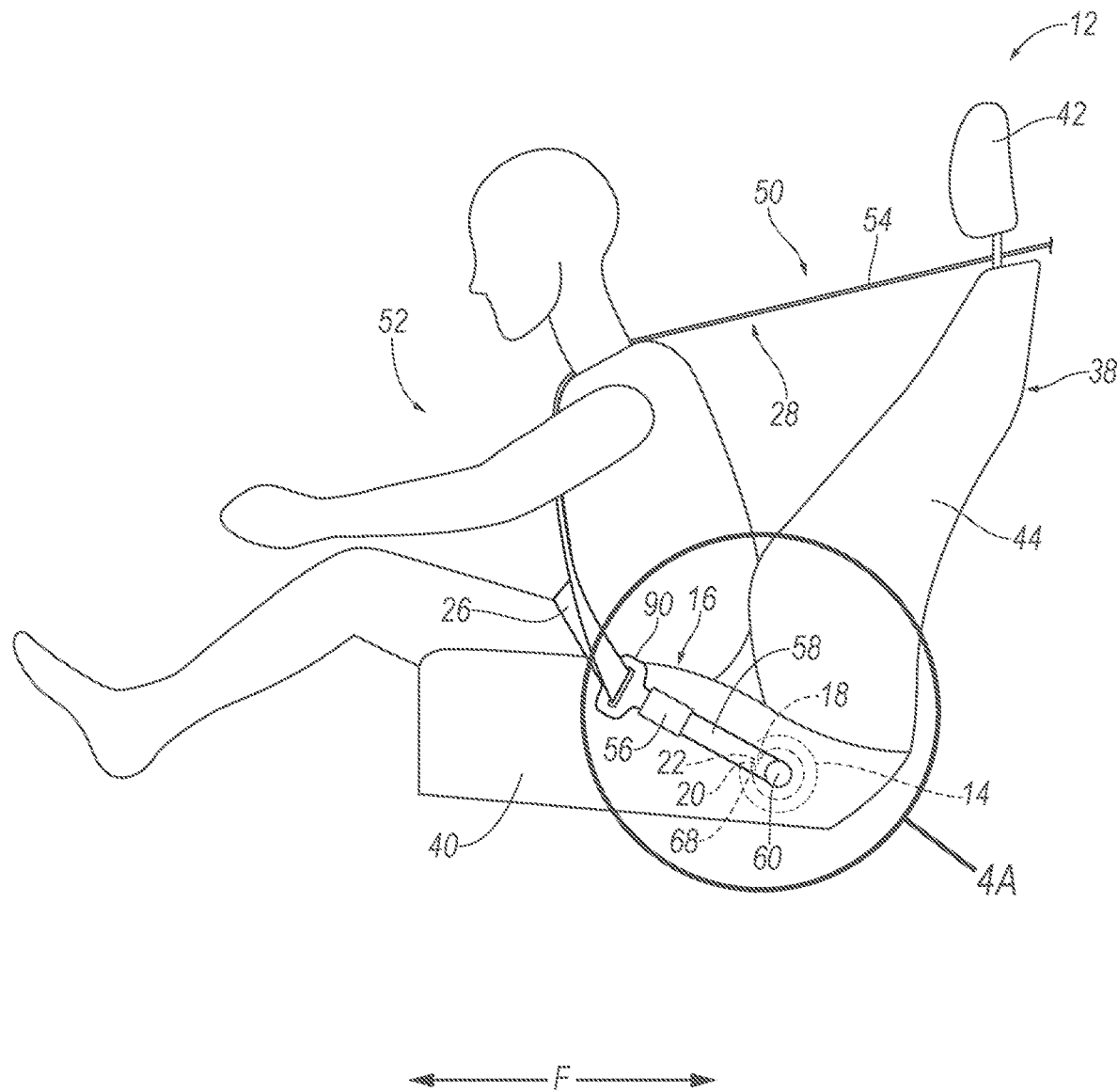
FIG. 5 is a side view of the vehicle seat having the seatbelt buckle in a second position.
Figure 5A:
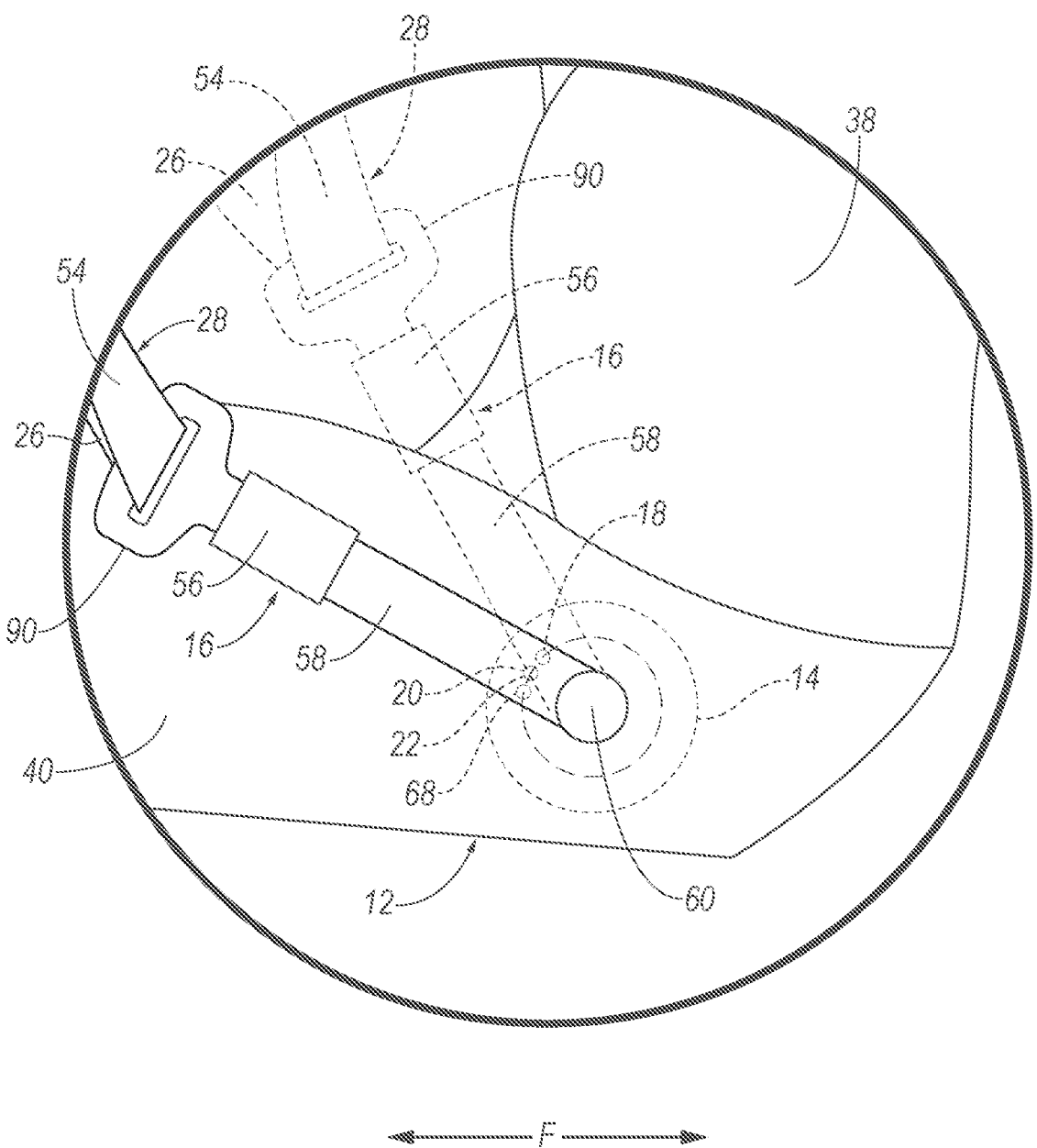
FIG. 5A is a side view of the seatbelt buckle in the second position.
Figure 6:
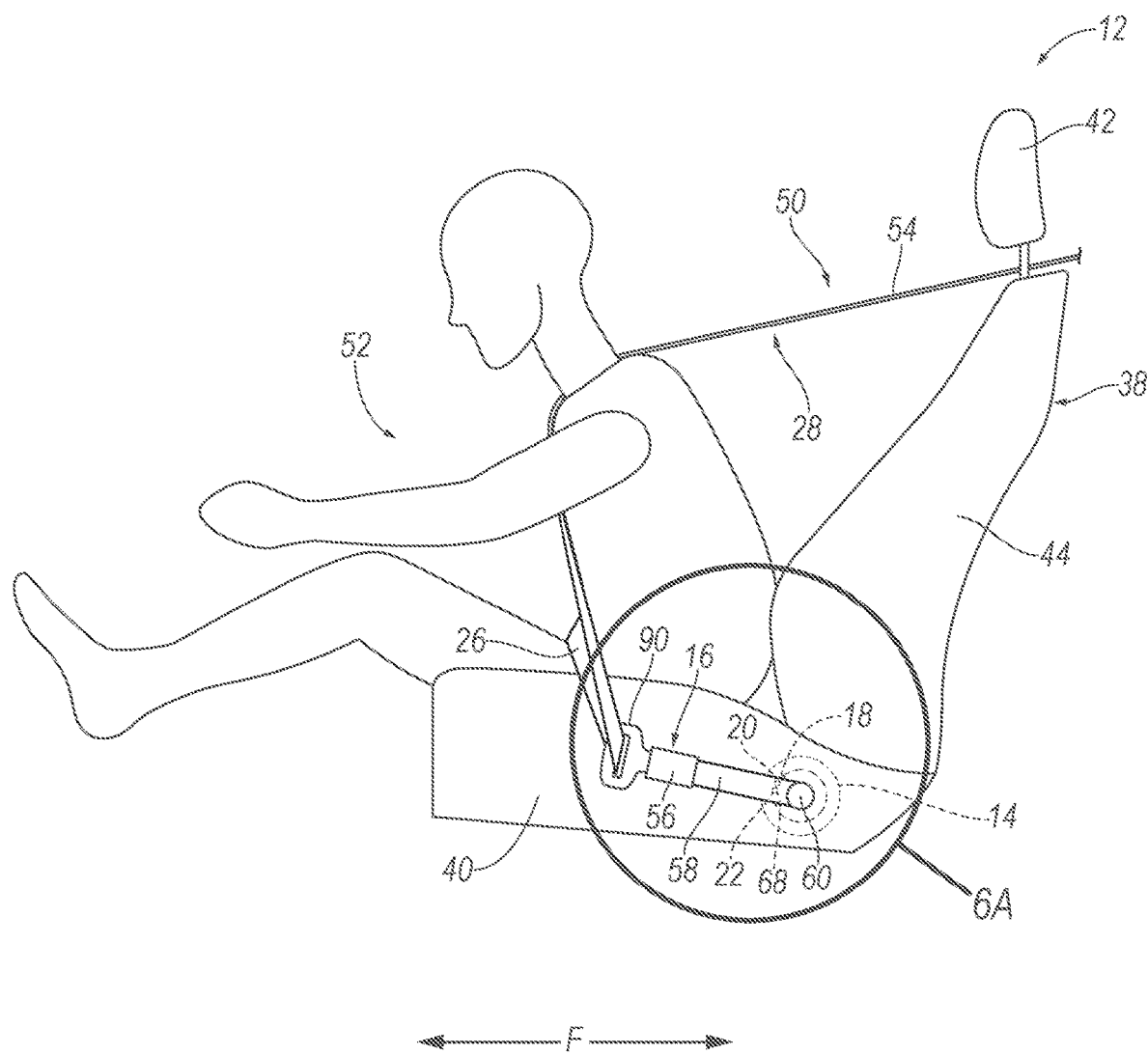
FIG. 6 is a side view of the vehicle seat having the seatbelt buckle in a third position.
Figure 6A:
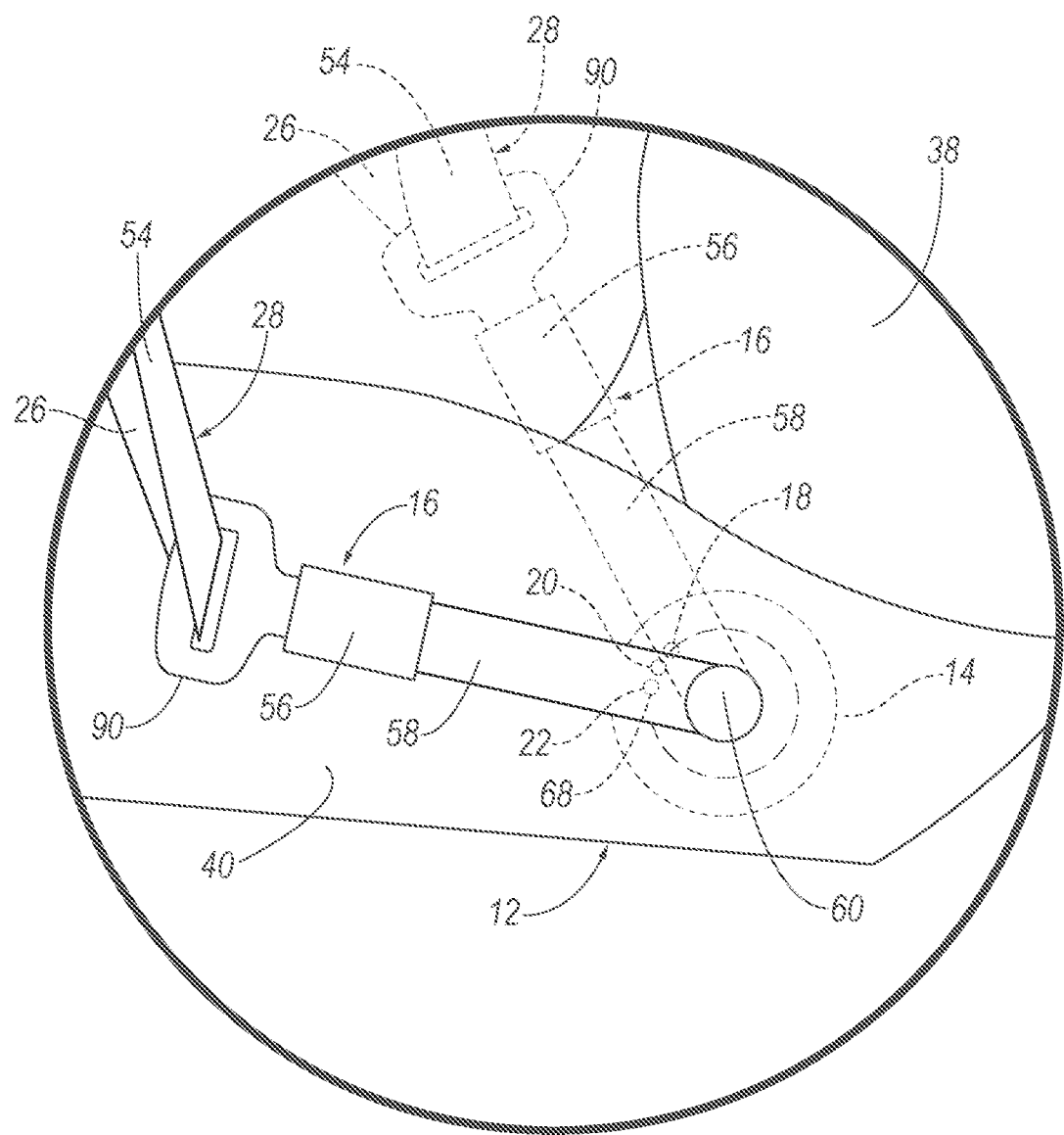
FIG. 6A is a side view of the seatbelt buckle in the third position.
Figure 7:
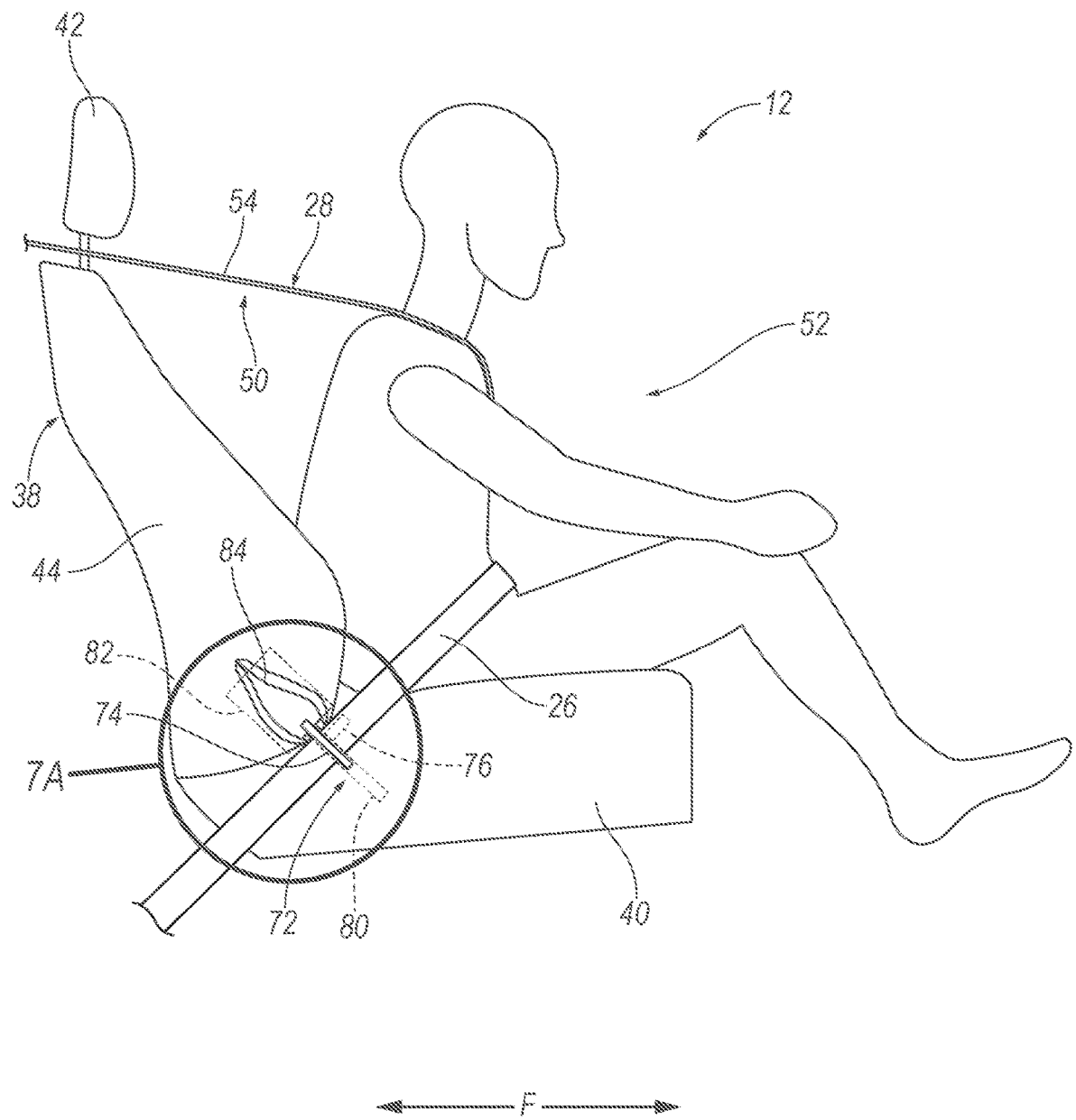
FIG. 7 is a side view of the vehicle seat having the hook assembly in a retracted position.
Figure 7A:
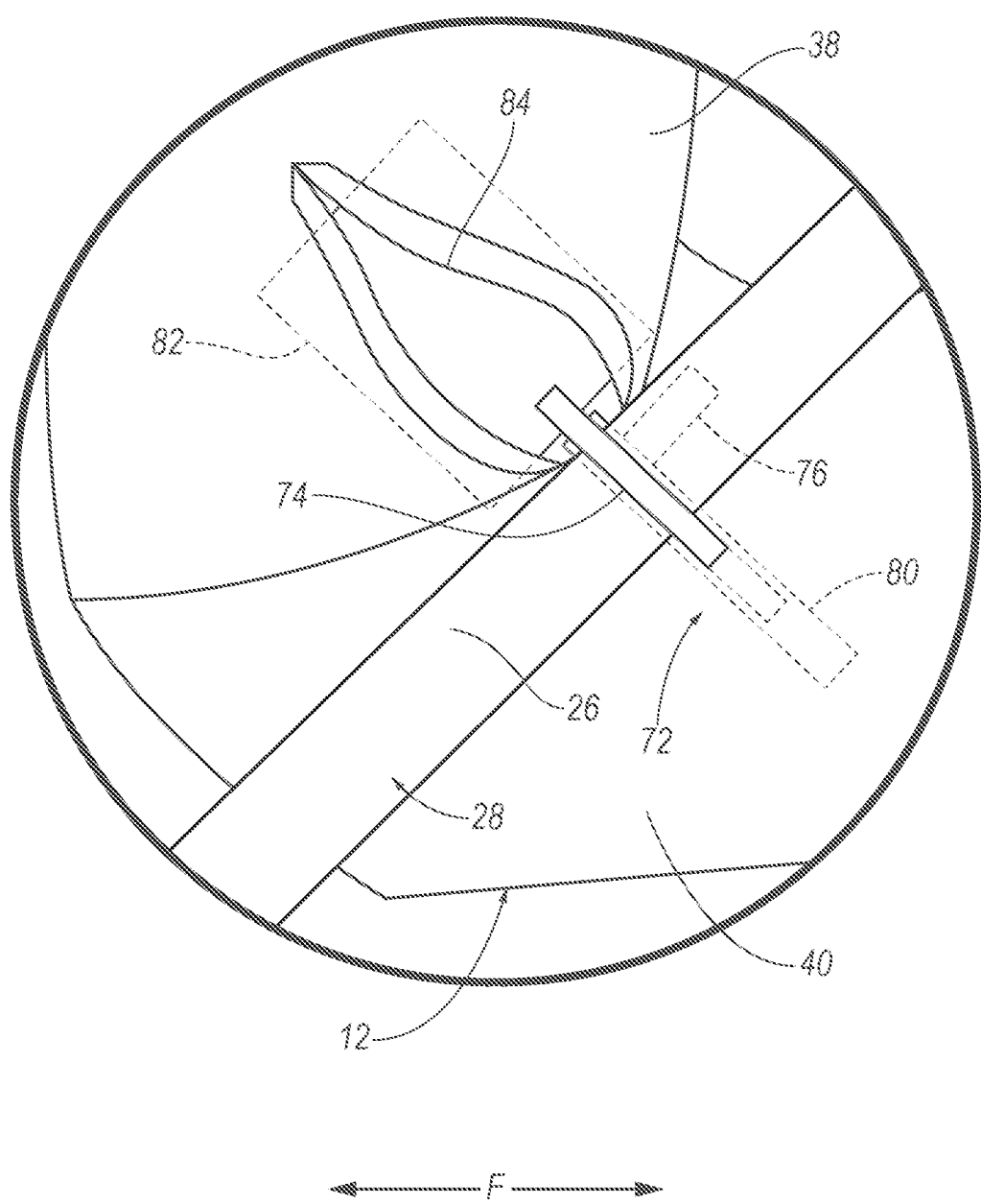
FIG. 7A is a side view of the hook assembly in the retracted position.
Figure 8A:
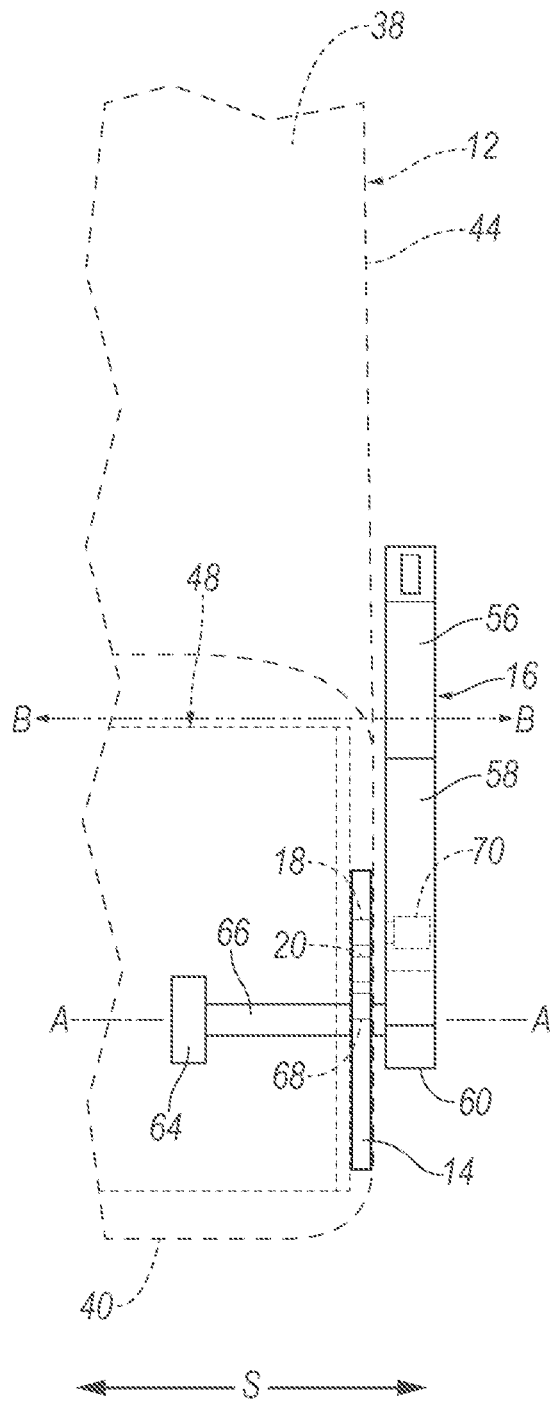
FIG. 8A is a frontal view of the seatbelt buckle in the first position and a pin supported by the seatbelt buckle in a retracted position.
Figure 8B:
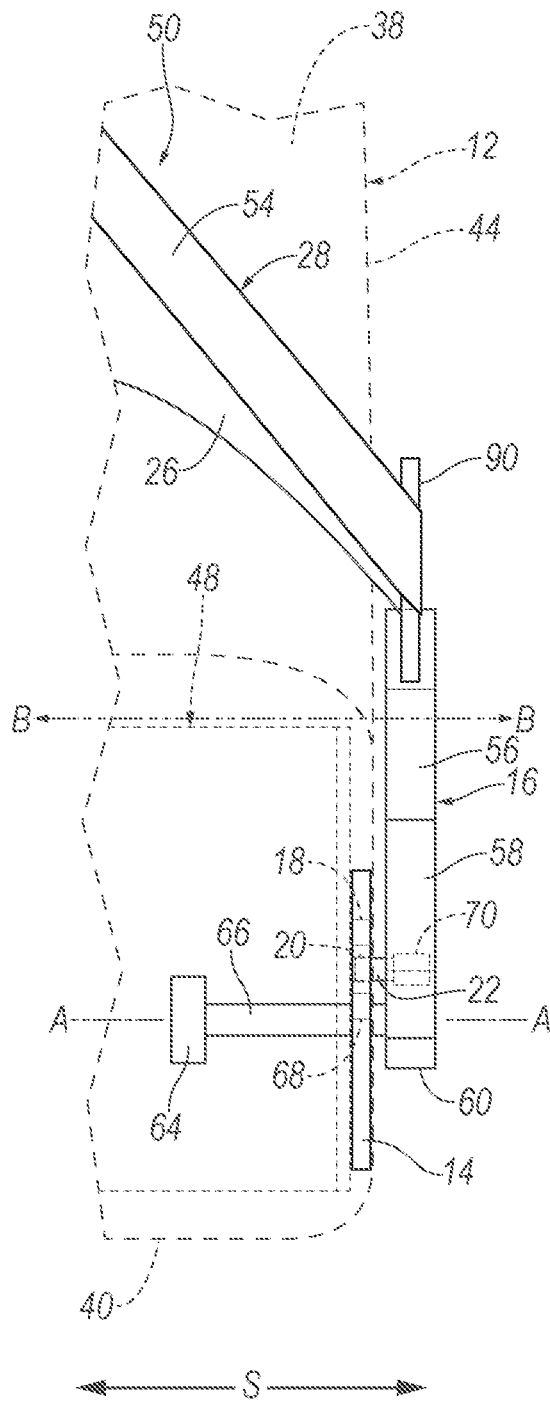
FIG. 8B is a frontal view of the seatbelt buckle in the second position and the pin in an extended position.

The pin 22 is receivable by the slots 18, 20, 68. With reference to FIGS. 4 and 4A, the pin 22 is receivable by the first slot 18 when the seatbelt buckle 16 is in the first position. With reference to FIGS. 5 and 5A, the pin 22 is receivable by the second slot 20 when the seatbelt buckle 16 is in the second position. With reference to FIGS. 6 and 6A, the pin 22 is receivable by the third slot 68 when the seatbelt buckle 16 is in the third position. In other words, the pin 22 is positioned to extend from the retracted position to the extended position into the first slot 18 when the seatbelt buckle 16 is in the first position, the pin 22 is positioned to extend from the retracted position to the extended position into the second slot 20 when the seatbelt buckle 16 is in the second position, and the pin 22 is in the extended position and extending into the third slot 68 when the seatbelt buckle 16 is in the third position. The pin 22 being in one of the slots 18, 20, 68 maintains the seatbelt buckle 16 in the respective position in the event of certain vehicle impacts such that the lap portion 26 of the webbing 28 moves in the seat-forward direction F. FIGS. 4A, 5A, and 6A all show in hidden lines the original position, i.e., the stowed position of the seatbelt buckle 16.

The pin 22 is biased toward one of the slots 18, 20, 68 when the seatbelt buckle 16 is in one of the other positions. An actuator 70 may bias the pin 22 toward the second retracted position and the extended position in response to detected engagement of the latch plate 90 with the seatbelt buckle 16. The actuator 70 may be any suitable type of actuator 70, e.g., a solenoid including the pin 22, a motor, etc. The actuator 70 may be supported by one of the plate 14 and the seatbelt buckle 16. In the example shown in the Figures, the pin 22 moves from the seatbelt buckle 16 and toward the plate 14, i.e., the actuator 70 is supported by the seatbelt buckle 16 to bias the pin 22 toward the plate 14. In other examples, e.g., when the pin 22 is supported by the plate 14, the pin 22 moves toward the seatbelt buckle 16 as the pin 22 moves to the retracted position, i.e., the actuator 70 is supported by the plate 14 to bias the pin 22 toward the seatbelt buckle 16.

With reference to FIGS. 3, 3A, 7, and 7A, the vehicle 10 includes a hook assembly 72. The hook assembly 72 includes a hook 74, a lock 76, a pyrotechnic device 78, and may include a track 80. In the event of certain vehicle impacts, the pyrotechnic device 78 may be activated to allow the hook 74 to move from an extended position to a retracted position. As the hook 74 moves to the retracted position, the hook 74 engages the lap portion 26 of the webbing 28 to move the lap portion of the webbing 28 downwardly along the torso of the occupant simultaneously with the rotation of the seatbelt buckle 16. In other words, the seatbelt buckle 16 and the hook assembly 72 may move the lap portion 26 down along the torso of the occupant of the seat 12.

The hook assembly 72 is supported by the seat 12. The hook assembly 72 is fixed relative to the seat 12, e.g., the hook assembly 72 is fixed to the seat 12. In some examples, such as shown in the Figures, the hook assembly 72 is supported by the seatback 38. In such an example, the hook assembly 72 is fixed to the seat frame 48 of the seatback 38 between the seat frame 48 and the covering of the seat 12. In other examples, the hook assembly 72 may be supported by the seat bottom 40. In such an example, the hook assembly 72 is fixed to the seat frame 48 of the seat bottom 40 between the seat frame 48 and the covering of the seat 12. In yet further examples, the hook assembly 72 may be supported by any suitable portion of the seat 12. In either example discussed above, the covering of the seat 12 may include a cavity 82 surrounding the hook assembly 72 to allow movement of the seat 12 around the hook assembly 72 and the covering may include a releasable seam 84, e.g., a tear seam, adjacent the hook assembly 72.

As discussed above, the hook assembly 72 is supported by the seat 12. In other words, the hook 74 is supported by the seat 12. The track 80 is fixed to the seat 12 and the hook 74 is movable relative to the track 80 from the extended position to the retracted position. Specifically, the hook 74 is retractable relative to the track 80. When the hook 74 moves to the retracted position, the hook 74 may release the releasable seam 84 to allow the hook 74 to engage the lap portion 26 of the webbing 28. The hook 74 and the track 80 are supported by the second side 46 of the seat 12. In other words, the track 80 and hook 74 are supported by an opposite side of the seat 12 from the seatbelt buckle 16. The occupant-seating area 52 of the seat 12 is between the hook 74 and the track 80 and the seatbelt buckle 16. In other words, the occupant of the seat 12 is seated between the hook 74 and the track 80 and the seatbelt buckle 16.

With reference to FIGS. 3, 3A, 7, and 7A, the hook assembly 72 includes the lock 76 engageable with the hook 74. The lock 76 engages with the hook 74 to maintain the hook 74 in the extended position during operation of the vehicle 10, e.g., in the absence of certain vehicle impacts. In the event of certain vehicle impacts, the lock 76 disengages the hook 74 to allow the hook 74 to retract to the retracted position. After the hook 74 reaches the retracted position, the lock 76 re-engages the hook 74 to maintain the hook 74 in the retracted position.

The lock 76 includes a pin (not shown), a first spring (not shown), and a housing (not numbered). The pin of the lock 76 is slidable relative to the housing. In the example shown in the Figures, the pin of the lock 76 is slidable relative to the housing from a first extended position to a retracted position and from the retracted position to a second extended position to disengage the hook 74 and to reengage the hook 74.

The hook assembly 72 includes the pyrotechnic device 78 operatively coupled to the lock 76 to disengage the pin of the lock 76 from the hook 74. In the example shown in the Figures, the pyrotechnic device 78 is operatively coupled to the pin of the lock 76 to retract the pin of the lock 76 from the hook 74. In the event of certain vehicle impacts, the pyrotechnic device 78 activates to retract the pin of the lock 76 away from the hook 74 to allow hook 74 to move to the retracted position. In the event of certain vehicle impacts, the pyrotechnic device 78 includes a pyrotechnic charge that activates to move the pin of the lock 76 from the first extended position to the retracted position. The pyrotechnic charge overcomes force of the first spring to move the pin of the lock 76 to the retracted position. The pyrotechnic charge may be combustible to produce a gas. The pyrotechnic charge may be formed of a solid mixture of substances that, when ignited, react to produce the gas. For example, the pyrotechnic charge may be formed of sodium azide ($NaNO_3$), potassium nitrate ($KNO_3$), and silicon dioxide ($SiO_2$), which react to form nitrogen gas ($N_2$).

Figure 9:
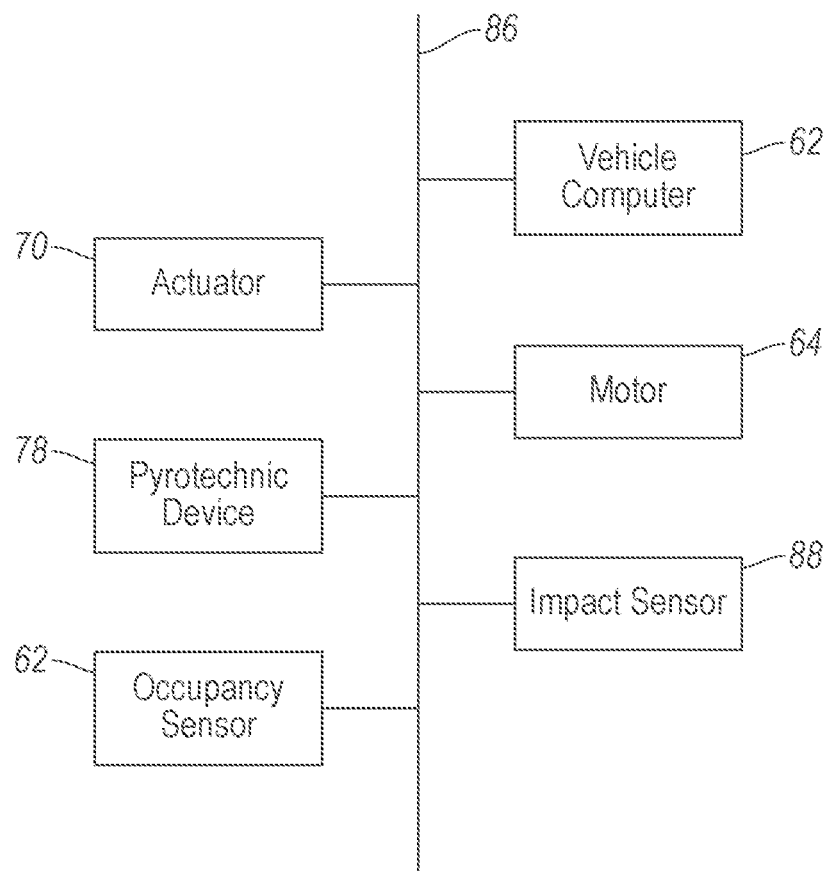
FIG. 9 is a block diagram of a vehicle communication network of the vehicle.

With reference to FIG. 9, the vehicle computer 24 includes a processor and a memory storing instructions executable by the processor. The memory includes one or more forms of computer readable media, and stores instructions executable by the vehicle computer 24 for performing various operations, including as disclosed herein. The vehicle computer 24 may be a restraints control module. The vehicle computer 24 can be a generic computer with the processor and the memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, the vehicle computer 24 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the vehicle computer 24.

The vehicle computer 24 is generally arranged for communications on a vehicle communication network 86 that can include a bus in the vehicle 10 such as a controller area network CAN or the like, and/or other wired and/or wireless mechanisms. Alternatively or additionally, in cases where the vehicle computer 24 actually comprises a plurality of devices, the vehicle communication network 86 may be used for communications between devices represented as the vehicle computer 24 in this disclosure. Further, as mentioned below, various controllers and/or sensors may provide data to the vehicle computer 24 via the vehicle communication network 86.

The vehicle 10 may include at least one impact sensor 88 for sensing certain vehicle impacts (e.g., impacts of a certain magnitude, direction, etc.). The impact sensor 88 may be configured to sense certain vehicle impacts prior to impact, i.e., pre-impact sensing. The impact sensor 88 may be in communication with the vehicle computer 24. The impact sensor 88 is configured to detect certain vehicle impacts. In other words, a "certain vehicle impact" is an impact of a specific type and/or magnitude, i.e., "certain" indicates the type and/or magnitude of the impact. The type and/or magnitude of such "certain vehicle impacts" may be pre-stored in the vehicle computer 24, e.g., a restraints control module. The impact sensor 88 may be of any suitable type, for example, post contact sensors such as accelerometers, pressure sensors, and contact switches; and pre-impact sensors such as radar, LIDAR, and vision sensing systems. The vision sensing systems may include one or more cameras, CCD image sensors, CMOS image sensors, etc. The impact sensor 88 may be located at numerous points in or on the vehicle 10.

The vehicle 10 may include at least one occupancy sensor 62. The occupancy sensor 62 is configured to detect occupancy of the seats 12, e.g., detect an occupant in the occupant-seating area 52. The occupancy sensor 62 may include visible-light or infrared cameras directed at the seat 12, weight sensors supported by the seat bottom 40, sensors detecting whether latch plate 90 is engaged with the seatbelt buckle 16, or other suitable sensors. The occupancy sensor 62 provides data to the vehicle computer 24 specifying whether the seat 12 is occupied or unoccupied and information regarding the type of occupant. As one example, the vehicle 10 may include one occupancy sensor 62 for each occupant-seating area 52. As another example, the vehicle 10 may include one occupancy sensor 62 that is designed to individually detect occupancy of each occupant-seating area 52.

Figure 10:
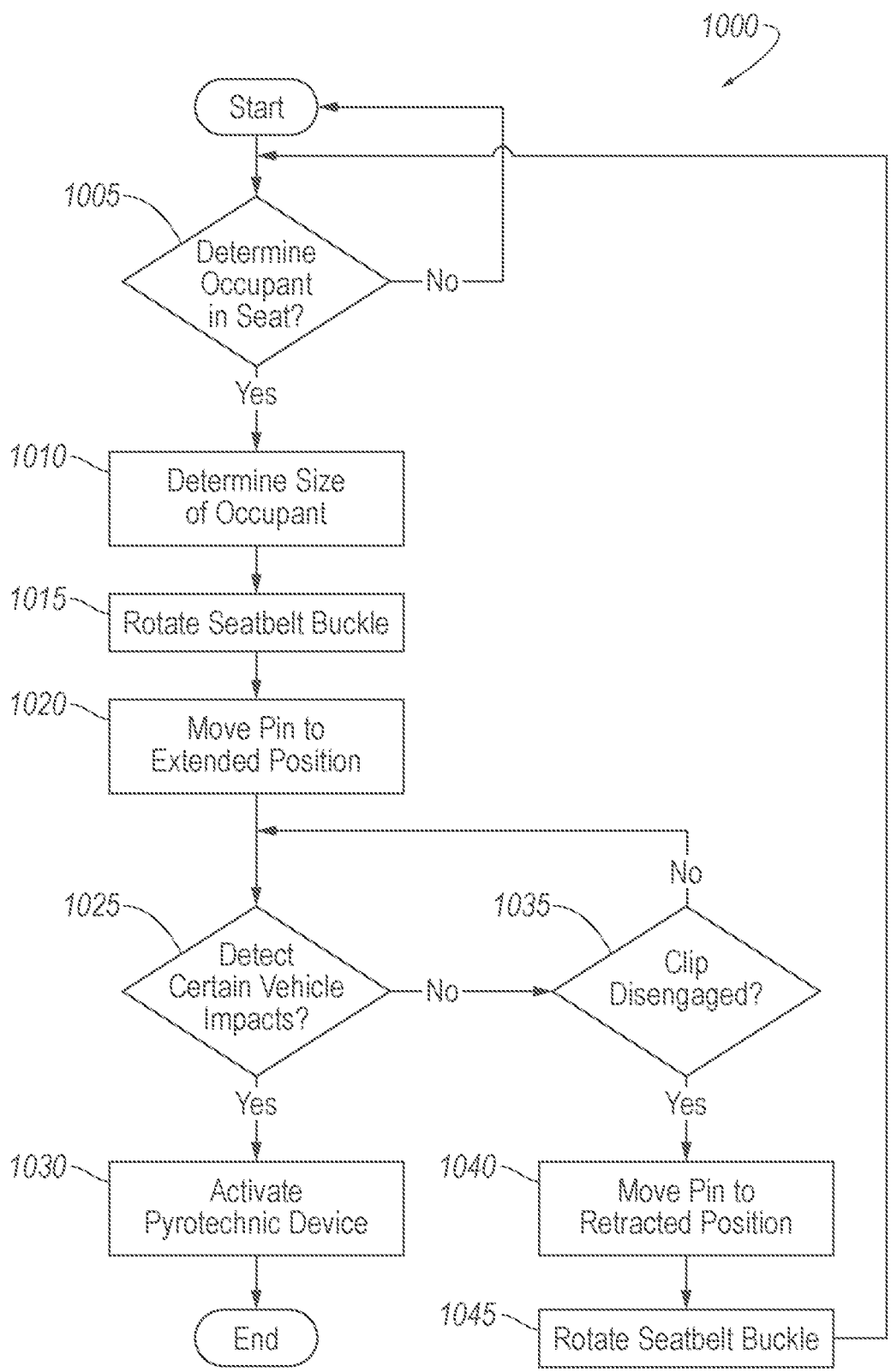
FIG. 10 is a flow chart of a method executable by a vehicle computer.

With reference to FIG. 10, the vehicle computer 24 stores instructions to control components of the vehicle 10 according to the method. Specifically, the vehicle computer 24 identifies the size of an occupant seated in the seat 12 and rotates the seatbelt buckle 16 to a position corresponding to the size of the occupant. Use of "in response to," "based on," and "upon determining" herein, including with reference to method, indicates a causal relationship, not merely a temporal relationship.

With reference to decision block 1005, the method includes determining whether an occupant is seated in the seat 12. The determination of whether an occupant is seated in the seat 12 includes determining that the latch plate 90 of the seatbelt assembly 50 is engaged with the seatbelt buckle 16. The occupancy sensor 62 for the seat 12 may send a signal to the vehicle computer 24 that the latch plate 90 is engaged with the seatbelt buckle 16. In other words, the engagement of the latch plate 90 with the seatbelt buckle 16 is detected to determine an occupant is seated in the seat 12. If an occupant is determined to be in the seat 12, the method continues to block 1010. If no occupant is determined to be in the seat 12, the method returns to its start.

With reference to block 1010, the method includes determining the size of the occupant of the seat 12. The occupancy sensor 62 may send a signal to the vehicle computer 24 indicating the size of the occupant of the seat 12.

With reference to block 1015, based on determining the size of the occupant of the seat 12, the method includes rotating the seatbelt buckle 16 to one of the first position, the second position, or the third position corresponding to the size of the occupant identified. The vehicle computer 24 may send a signal to the motor 64 to rotate the seatbelt buckle 16 to a position corresponding to the slot 18, 20, 68 corresponding to the size of the occupant.

With reference to block 1020, based on identifying an occupant is in the seat 12 and that the seatbelt buckle 16 is moved to one of the first position, the second position, or the third position, the method includes moving the pin 22 to the extended position. The vehicle computer 24 may send a signal to the actuator 70 to bias the pin 22 toward the extended position and move to the extended position.

With reference to decision block 1025, the method includes detecting certain vehicle impacts. The impact sensors 88 may send a signal to the vehicle computer 24 that certain vehicle impacts have or will occur. If certain vehicle impacts are detected, the method continues to block 1030. If certain vehicle impacts are not detected, the method continues to decision block 1035.

With reference to block 1030, in response to detecting certain vehicle impacts, the method includes activating the pyrotechnic device 78. In response to activation of the pyrotechnic device 78, the pin of the lock disengages the hook 74 and the hook 74 moves to the retracted position. After the pyrotechnic device 78 is activated, the method ends.

With reference to decision block 1035, in response to no certain vehicle impacts being detected, the method includes detecting that the latch plate 90 is disengaged with the seatbelt buckle 16, e.g., for determining an occupant is exiting the vehicle. If an occupant is exiting the vehicle 10, the occupant may disengage the latch plate 90 from the seatbelt buckle 16. If the latch plate 90 remains engaged, the method returns to decision block 1025.

With reference to block 1040, based on detecting the latch plate 90 is disengaged with the seatbelt buckle 16, the method includes activating the actuator 70 to move the pin 22 from the extended position to the retracted position. The vehicle computer 24 may send a signal to the actuator 70 to move the pin 22 toward the retracted position.

With reference to block 1045, based on the pin 22 moving to the retracted position, the method includes rotating the seatbelt buckle 16 to the stowed position. The vehicle computer 24 may send a signal to the motor 64 to rotate the seatbelt buckle 16 to the stowed position. After the seatbelt buckle 16 rotates to the stowed position, the method returns to decision block 1005 to determine if another occupant is seated in the seat 12.

The disclosure has been described in an illustrative manner, and it is to be understood that the terminology which has been used is intended to be in the nature of words of description rather than of limitation. The numerical adjectives "first," "second," and "third" are used herein merely as identifiers, do not signify order or importance, and may be used interchangeably Many modifications and variations of the present disclosure are possible in light of the above teachings, and the disclosure may be practiced otherwise than as specifically described.

What is claimed is:

1. A vehicle comprising:
   a vehicle seat;
   a plate fixed relative to the vehicle seat;
   a seatbelt buckle rotatably supported by the vehicle seat, the seatbelt buckle being rotatable relative to the plate from a stowed position to one of a first position or a second position;
   a first slot and a second slot both in one of the plate or the seatbelt buckle;

a pin supported by the other of the plate or the seatbelt buckle, the pin being moveable relative to the other of the plate or the seatbelt buckle from a retracted position to an extended position;

the pin being spaced from the first slot and the second slot when the seatbelt buckle is in the stowed position;

the pin being positioned to extend from the retracted position to the extended position into the first slot when the seatbelt buckle is in the first position;

the pin being positioned to extend from the retracted position to the extended position into the second slot when the seatbelt buckle is in the second position; and a computer including a processor and a memory storing instructions executable by the processor to:
rotate the seatbelt buckle to one of the first position or the second position based on a size of an occupant of the vehicle seat; and
then, move the pin to the extended position.

2. The vehicle of claim 1, further comprising: a third slot in the one of the plate and the seatbelt buckle; the seatbelt buckle is rotatable to one of the first position, the second position, or a third position; and the pin being in the extended position and extending into the third slot when the seatbelt buckle is in the third position.

3. The vehicle of claim 1, wherein the seatbelt buckle rotates about a rotational axis parallel to a cross-seat axis.

4. The vehicle of claim 3, wherein the pin is spaced from the rotational axis.

5. The vehicle of claim 1, wherein the vehicle seat includes a seatback, the seatbelt buckle being rotatable away from the seatback from the stowed position to the first position and the second position.

6. The vehicle of claim 1, wherein the vehicle seat includes a seat bottom, the plate being fixed relative to the seat bottom and the seatbelt buckle is rotatable relative to the seat bottom.

7. The vehicle of claim 1, wherein the seatbelt buckle is rotatable relative to the vehicle seat in a seat-forward direction.

8. The vehicle of claim 1, wherein the pin moves in a cross-seat direction from the retracted position to the extended position.

9. The vehicle of claim 1, wherein the seatbelt buckle is rotatable about a rotational axis; the pin, the first slot, and the second slot being spaced from the rotational axis.

10. The vehicle of claim 1, further comprising a solenoid including the pin.

11. The vehicle of claim 1, wherein the pin is biased toward one of the first slot or the second slot in the extended position.

12. The vehicle of claim 1, further comprising a latch plate engageable with the seatbelt buckle, the seatbelt buckle rotating away from the stowed position when the latch plate is engaged with the seatbelt buckle.

13. The vehicle of claim 12, wherein the pin is moveable from the retracted position to the extended position when the latch plate is engaged with the seatbelt buckle.

14. The vehicle of claim 12, further comprising a webbing, the latch plate being moveable along the webbing to define a lap portion, the lap portion being moveable in a seat-forward direction as the seatbelt buckle moves from the stowed position toward the first position and the second position.

15. The vehicle of claim 1, further comprising:
a latch plate engageable with the seatbelt buckle; and
an actuator biasing the pin toward the extended position in response to detected engagement of the latch plate with the seatbelt buckle.

16. The vehicle of claim 1, wherein the instructions include to detect engagement of a latch plate with the seatbelt buckle.

17. The vehicle of claim 16, wherein the instructions include to detect disengagement of the latch plate with the seatbelt buckle.

18. The vehicle of claim 17, wherein the instructions include to, based on detection of disengagement of the latch plate, move the pin from the extended position to the retracted position and rotate the seatbelt buckle to the stowed position.

* * * * *